United States Patent
So et al.

(10) Patent No.: US 10,841,569 B2
(45) Date of Patent: Nov. 17, 2020

(54) STEREOSCOPIC DISPLAY DEVICE

(75) Inventors: Hyun-Jin So, Seoul (KR); Byung-Moo Choi, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 974 days.

(21) Appl. No.: 12/914,587

(22) Filed: Oct. 28, 2010

(65) Prior Publication Data

US 2011/0102557 A1 May 5, 2011

(30) Foreign Application Priority Data

Nov. 5, 2009 (KR) ........................ 10-2009-0106485

(51) Int. Cl.
*H04N 13/398* (2018.01)
*H04N 13/341* (2018.01)

(52) U.S. Cl.
CPC ......... *H04N 13/398* (2018.05); *H04N 13/341* (2018.05)

(58) Field of Classification Search
CPC ........... H04N 13/0497; H04N 13/0438; H04N 13/0239; H04N 13/0048; H04N 13/0059; H04N 13/0296; H04N 13/0003; H04N 2213/008; G02B 27/2214; G02B 27/2264; G02B 27/22; G02B 27/017; G02B 27/2228
USPC ..................................... 348/42–60; 349/1–18
See application file for complete search history.

(56) References Cited

U.S. PATENT DOCUMENTS

| | | |
|---|---|---|
| 5,654,749 A | 8/1997 | Kanno |
| 5,808,588 A * | 9/1998 | Lin .................................. 345/6 |
| 6,456,432 B1 | 9/2002 | Lazzaro et al. |
| 2007/0229395 A1 | 10/2007 | Slavenburg et al. |
| 2008/0284801 A1 * | 11/2008 | Brigham et al. ............. 345/690 |
| 2008/0303963 A1 | 12/2008 | Jung et al. |
| 2008/0309474 A1 * | 12/2008 | Okamoto et al. ............. 340/462 |

FOREIGN PATENT DOCUMENTS

| | | |
|---|---|---|
| CN | 1301115 A | 6/2001 |
| KR | 100723267 B1 | 5/2007 |
| KR | 1020080059937 A | 7/2008 |
| KR | 1020080107239 A | 12/2008 |

(Continued)

OTHER PUBLICATIONS

Office Action issued in corresponding Korean Patent Application No. 10-2009-0106485, dated Nov. 5, 2012.

(Continued)

*Primary Examiner* — Farhan Mahmud
(74) *Attorney, Agent, or Firm* — Seed Intellectual Property Law Group LLP

(57) ABSTRACT

The present disclosure relates to a stereoscopic display device which enhances accessibility from a stereoscopic display device to other multimedia device, the stereoscopic display device includes a flat panel that displays an image, the flat panel generating a porch signal on each frame of the image being display and having a predetermined period of blank time after generation of the porch signal, a stereo controller that senses the porch signal to generate a wireless goggle control signal, and a goggle that receives the goggle control signal according to wireless protocol at the time of watching the flat panel, to perceive a stereo 3D image by opening/closing a left eye lens and a right eye lens, selectively.

16 Claims, 5 Drawing Sheets

(56) References Cited

FOREIGN PATENT DOCUMENTS

TW          310061     7/1997
TW    200819788 A    5/2008

OTHER PUBLICATIONS

Office Action issued in corresponding Chinese Patent Application No. 201010274942.0, dated Aug. 10, 2012.
Office Action issued in corresponding Taiwanese Patent Application No. 099136978, dated Apr. 19, 2013.
Extended European Search Report issued in corresponding European Patent Application No. 10009350.9, dated Jan. 19, 2011.

\* cited by examiner

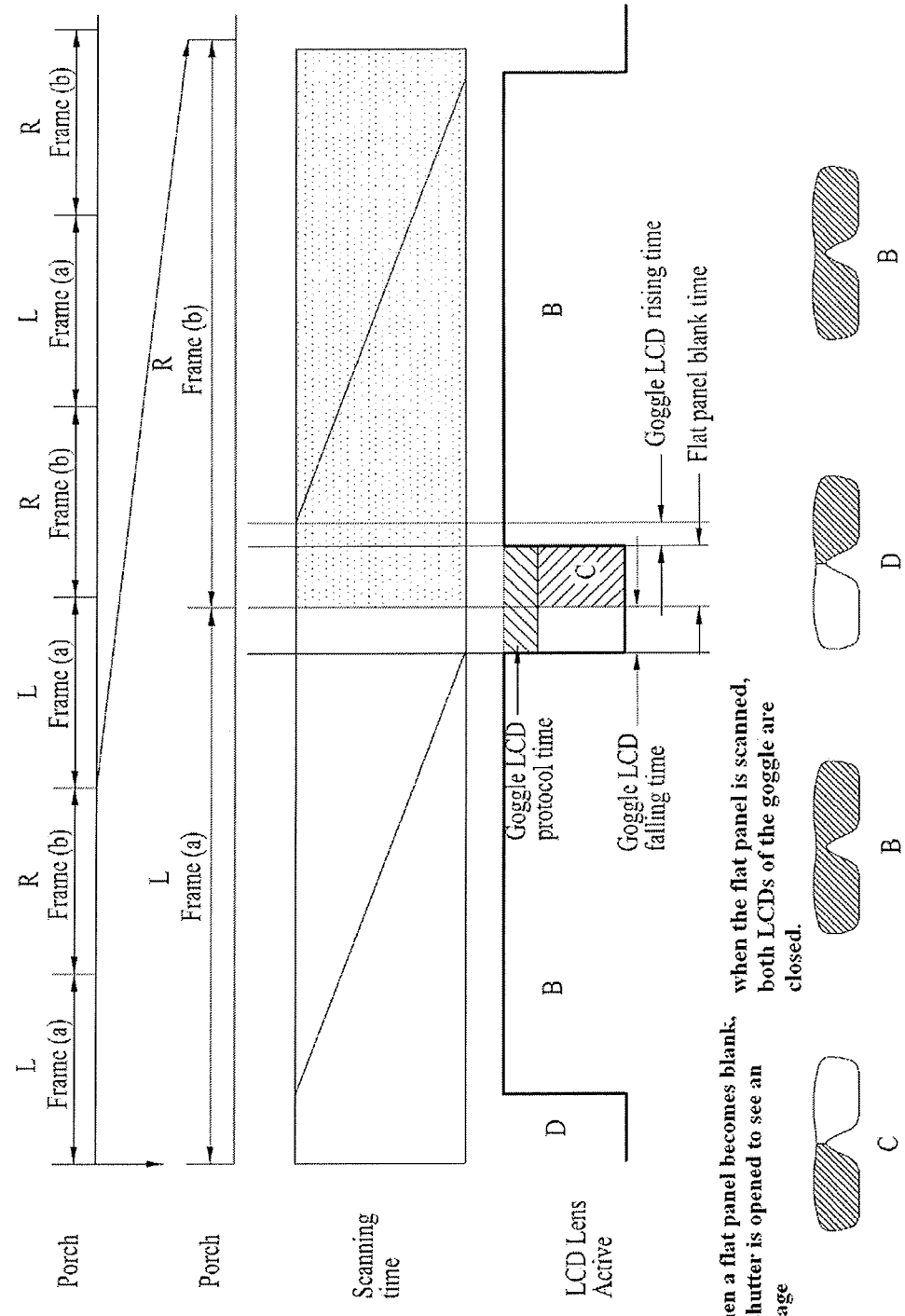

STEREOSCOPIC DISPLAY DEVICE

This application claims the benefit of Korea Patent Application No. 10-2009-0106485, filed on Nov. 5, 2009, the entire contents of which is incorporated herein by reference for all purposes as if fully set forth herein.

BACKGROUND

Field of the Invention

The present disclosure relates to display devices, and more particularly, to a stereoscopic display device goggle which enhances accessibility from a stereoscopic display device to other multimedia device by making driving synchronization with a flat panel, a stereo controller therefor, and a stereoscopic display device having the stereoscopic display device goggle and the stereo controller and a method for driving the same.

Discussion of the Related Art

It is foreseen that services to be realized for making faster information transmission to be constructed based on a super fast communication network will develop from the present simple "hearing and speaking" services such as telephone services to "watching and hearing" multimedia type services centered on digital terminals which process characters, voices and picture at a high speed, and finally to super spatial realistic three dimensional stereoscopic information communication services in which "watching, feeling and enjoying realistically and stereoscopically transcending time and space".

In general, a stereo 3D image which expresses three dimension is made by a principle of a stereoscopic view angle through the two eyes in which a left eye and a right eye see images slightly different from each other owing to a difference of positions of the two eyes as the two eyes have a difference of views, i.e., the two eyes are about 65 mm spaced from each other. The difference of images caused by the difference of the two eyes is called as binocular disparity. A three dimensional stereoscopic display device makes a user to have a stereoscopic feeling owing to the binocular disparity by making the left eye to see an image only on the left eye and the right eye to see an image only on the right eye by using the binocular disparity.

That is, the left/right eyes are made to see two dimensional images different from each other respectively, and if the two images are transmitted to a brain through a retina, the brain combines the two images accurately to produce a sense of depth and a sense of reality of an original three dimensional image. Such a capability is in general called as stereography, and a device having the stereography applied thereto is called as the stereoscopic display device.

In the meantime, in types for producing 3D in the stereoscopic display devices, there are a goggle type and no goggle type depending on presence of the goggle, and the goggle is called as stereoscopic display device goggle.

In a case of the goggle type, the stereoscopic display device goggle receives/transmits a signal from/to a PC (Personal Computer) connected to the display device, such that the two eyes with the goggle recognize different images out of the image from the display device to recognize a three dimensional image.

A related art stereoscopic display device will be described with reference to the attached drawing.

FIG. 1 illustrates a block diagram showing a system for displaying a stereo 3D image of a related art stereoscopic display device.

Referring to FIG. 1, the related art stereoscopic display device is provided with a PC (Personal Computer) having an image display control unit 25, a display panel 30 controlled by the image display control unit 25 for forwarding a stereo 3D image, and a goggle 40 for recognizing images on the left eye and the right eye separating the image according to timing from the image display control unit 25 while watching the display panel 30.

The computer 50 is provided with a central processor 21, a main memory 22, a secondary memory 23, a graphic processor 24, a bus 10 connected to above units, and the image display control unit 25 for controlling the external goggle 40 and the display panel by using images from above units and information on timing.

The operation of the related art stereoscopic display device will be described.

The central processor 21 and the graphic processor 24 form the stereo 3D image. The stereo 3D image is buffered by using the secondary memory 23. The image display control unit 25 checks the timing and transmits the image to the display panel 30.

In this instance, the image display control unit 25 makes the timing as a protocol of the goggle 40 and transmits to the goggle 40. Accordingly, the images on the left/right eyes are synchronized with the display panel 30 according to the timing and transmitted to the goggle 40.

If the stereo 3D image intended to display requires a high frame rate like a video game, since failure of synchronization of the goggle 40 controlled by the timing control of the image display control unit 25 in association with the graphic processor 24 and the display panel 30 at which a delay of displaying an image signal takes place after the image is processed by the graphic processor 24, an error can take place in displaying the stereo 3D image.

The related art stereoscopic display device has the following problems.

First, separate from the display panel, since the synchronizing signal of the goggle relies on the graphic processor, a time difference takes place between the goggle and an applied driving signal at the time of shifting a fast speed frame, exact synchronization of the stereo 3D image display is difficult.

Second, since the goggle is controlled by the graphic processor in the computer, hardware for the graphic processor is required for processing the stereo 3D image display separately, and mounting of a driver for driving the hardware and software for providing a stereo 3D image source thereto are required without fail. It takes a long time for general user to mount the hardware and the software for the graphic process and, particularly, the user is not skilled in mounting the driver causing frequent cases of abnormal mounting. In this case, the stereo 3D image display is not possible.

Third, since the goggle is controlled by the graphic processor in the computer, a source device used for displaying the stereo 3D image on the display panel is limited only to the computer.

Fourth, since a utilizing example of a case when the present computer is used as the multimedia source device is limited to PC games, the utilizing example is insignificant.

BRIEF SUMMARY

A stereoscopic display device includes a flat panel that displays an image, the flat panel generating a porch signal on each frame of the image being display and having a predetermined period of blank time after generation of the porch signal, a stereo controller for sensing the porch signal to generate a wireless goggle control signal, and a goggle for receiving the goggle control signal according to wireless protocol at the time of watching the flat panel, to perceive a stereo 3D image by opening/closing a left eye lens and a right eye lens, selectively.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 5 illustrates a timing diagram on driving of a stereoscopic display device goggle of the present disclosure.

DETAILED DESCRIPTION OF THE DRAWINGS AND THE PRESENTLY PREFERRED EMBODIMENTS

Reference will now be made in detail to the specific embodiments of the present disclosure, examples of which are illustrated in the accompanying drawings. Wherever possible, the same reference numbers will be used throughout the drawings to refer to the same or like parts.

Figure 1:
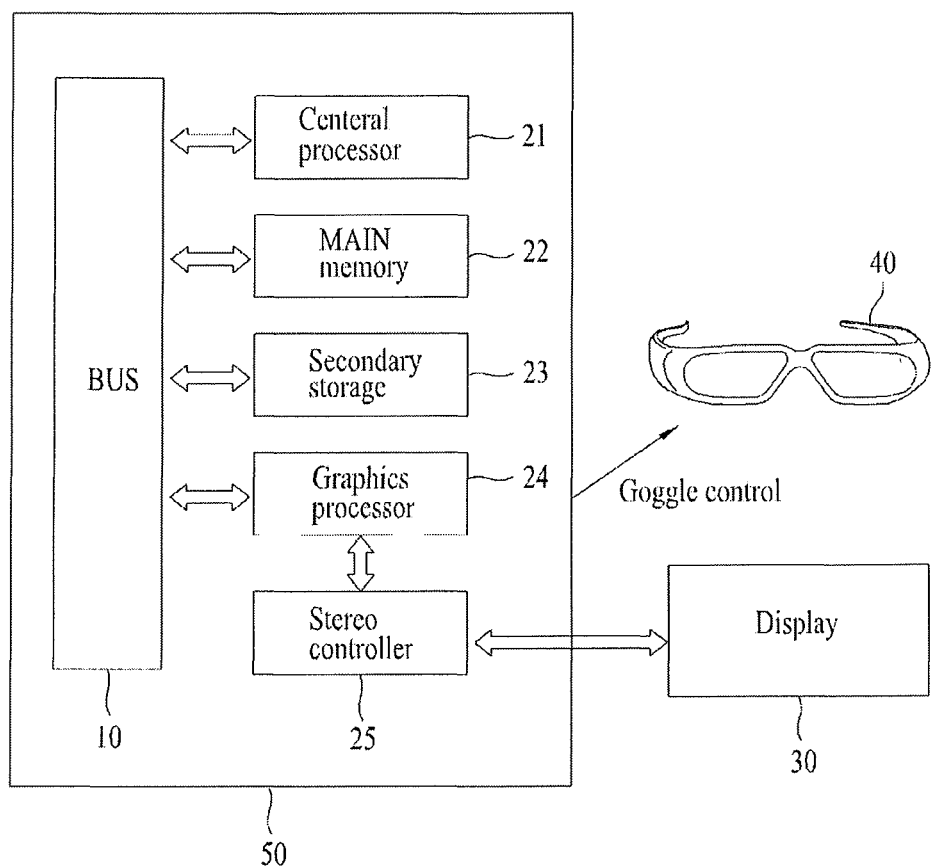
FIG. 1 illustrates a block diagram showing a system for displaying a stereo 3D image of a related art stereoscopic display device.
Figure 2:
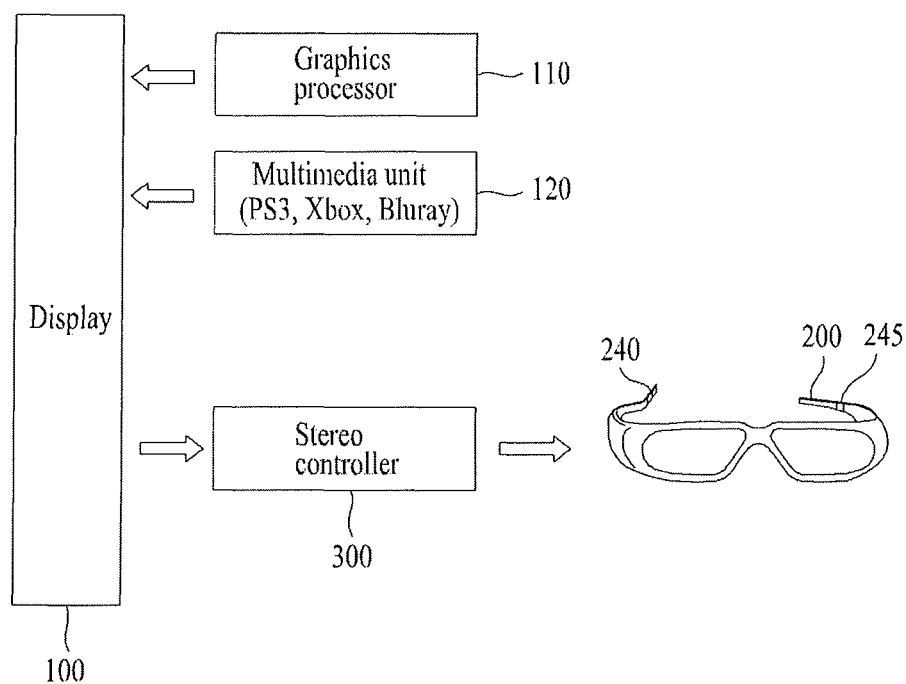
FIG. 2 illustrates a block diagram of a system for displaying a stereo 3D image of a stereoscopic display device in accordance with a preferred embodiment of the present disclosure.

FIG. 2 illustrates a block diagram of a system for displaying a stereo 3D image of a stereoscopic display device in accordance with a preferred embodiment of the present disclosure.

The stereoscopic display device includes a flat panel 100 for displaying an image, generating a porch signal for each frame being displayed and having a blank time of a preset time period after the generation of the porch signal, a stereo controller 300 for recognizing the porch signal to generate a radio goggle control signal, and a goggle 200 for receiving the goggle control signal according to a wireless protocol at the time of watching the flat panel 100 to make perception of the stereo 3D image by selective opening/closing of a left eye lens and a right eye lens.

The goggle control signal is a wireless signal of an infrared ray, or a radio frequency.

Besides the computer including a graphic processor 110, as a multimedia source device for providing stereoscopic display information to the flat panel 100, there can be a variety of multimedia source devices 120.

The stereo controller 300 provided separate from the flat panel 100 physically is connected to a first USB port (not shown) in the flat panel 100 with a cable provided thereto.

The stereo controller 300 checks a timing signal generated at a screen of the flat panel 100, turns the timing signal into wireless protocol and transmits the timing signal of the flat panel 100 to the goggle 200 watching the flat panel 100 for synchronizing the timing of the goggle 200 with the flat panel 100.

As utilizing examples of the flat panel 100, there can be a monitor of a computer, or a television set of liquid crystal display device, PDP (plasma display panel), organic light emitting diode display device, and so on. The flat panel 100 includes a driving unit for panel itself, along with an internal light source if the flat panel does not emit a light for itself.

As examples of the multimedia source device 120, there can be a supply source that provides image information on a game or the like, such as the play station PS series, the Xbox series, a supply source that provides image information on movies, animation, or game, such as bluray player, or a supply source such as workstation. The multimedia source device 120 has a disk mounted thereto for providing an image source, such as the movie, or the animation, for forwarding the image through the flat panel 100.

Depending on cases, the flat panel 100 is connected to a personal computer for being controlled by the graphic processor 110 in the personal computer.

The goggle 200 has glasses like exterior, a small sized LCDs provided to lens portions of the glasses for perception of the image signals on the left eye and the right eye, and a power supply unit 240 and a first USB port 245 for charging the power supply unit 240 provided to leg portions of the glasses.

The stereoscopic display device of the present disclosure checks a timing signal generated at a screen of the flat panel 100, turns the timing signal into wireless protocol by using the stereo controller 300 provided separate from the flat panel 100 physically, and applies a driving signal to the goggle 200 in synchronization with the timing signal.

Thus, by producing the stereo 3D image the watcher perceives through the goggle 200 to meet optical characteristics of the flat panel 100, a high quality image can be reproduced without an error. And the error caused by delay between the graphic processor and the flat panel in the related art stereoscopic display device at the time of driving at a high frame rate can be prevented, thereby improving operation reliability.

Not by using a sync timing generated at the graphic processor of the present disclosure, but by checking timing generated at the screen of the actual flat panel 100 and turning the timing into a wireless protocol and transmitting by using the stereo controller 300, the problem caused by error taken place coming from mounting method of the software can be solved, thereby improving the operation reliability. By enabling the image display control by applying a timing driving signal of the display panel 100 through the stereo controller, enabling the display panel 100 to access to the multimedia source device 120 directly, extensibility between the flat panel 100 and the multimedia source device 120 is enhanced, thereby enhancing utilization of the stereoscopic display device in a variety of directions.

The stereoscopic display device goggle, the stereo controller connected thereto and the stereoscopic display device will be described in detail.

Figure 3:
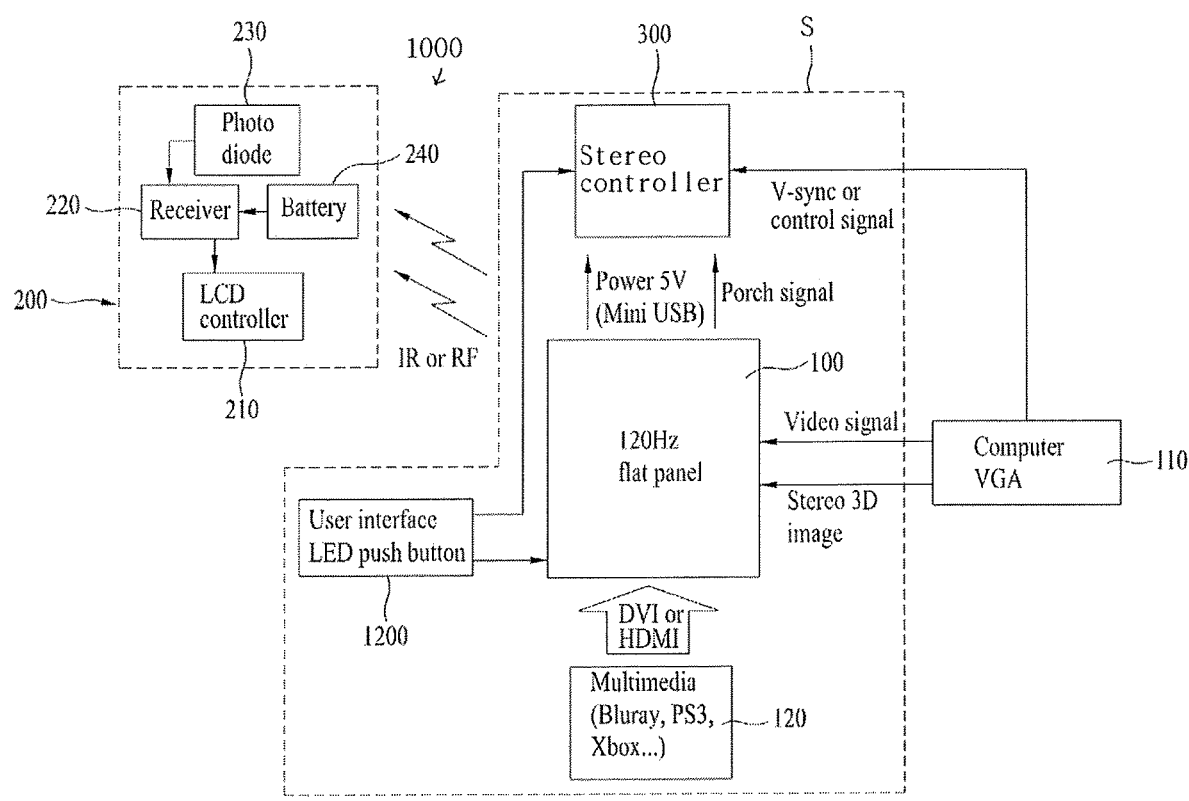
FIG. 3 illustrates a block diagram showing a stereoscopic display device having a stereoscopic display device goggle and a stereo controller of the present disclosure.
Figure 4:
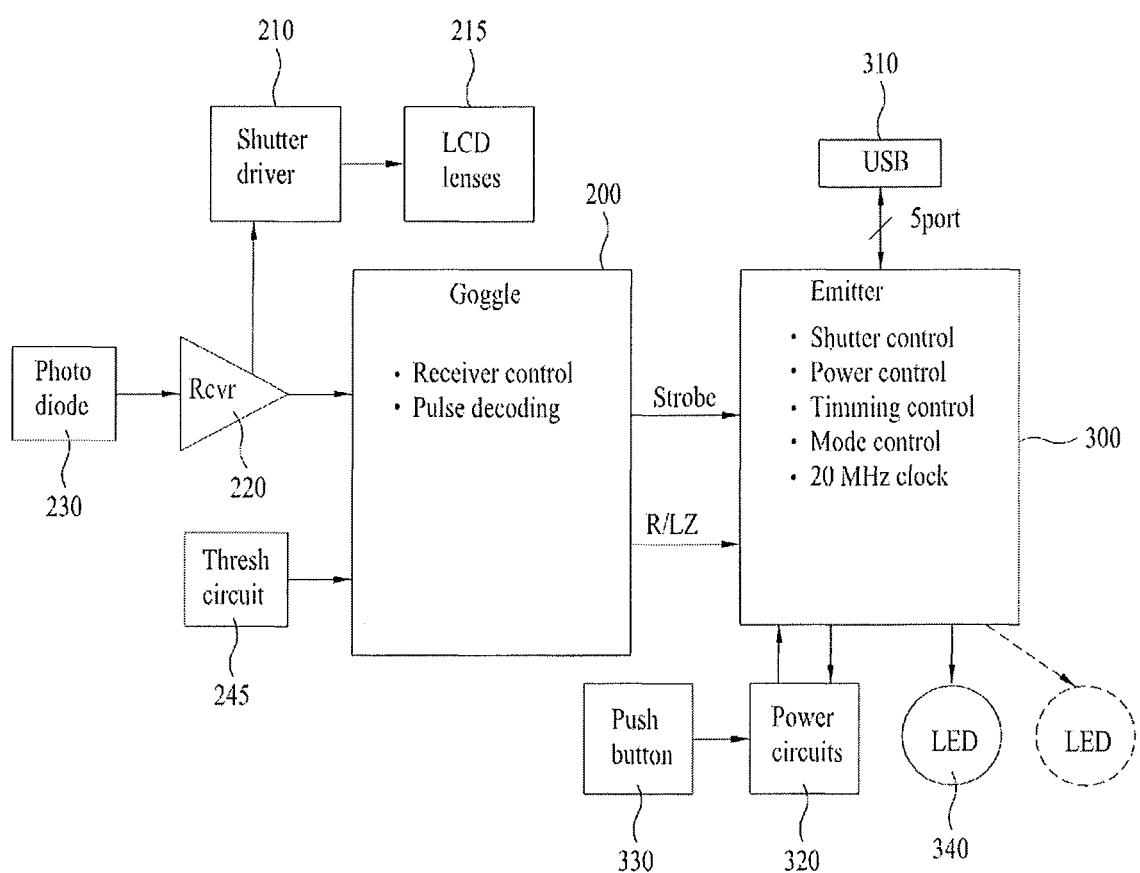
FIG. 4 illustrates a block diagram of a stereoscopic display device goggle and a stereo controller of the present disclosure and a related operation.

FIG. 3 illustrates a block diagram showing a stereoscopic display device that has a stereoscopic display device goggle and a stereo controller of the present disclosure. FIG. 4 illustrates a block diagram of a stereoscopic display device goggle and a stereo controller of the present disclosure and a related operation.

Referring to FIGS. 3 and 4, the stereoscopic display device goggle 200, controlled by the stereo controller 300 according to the wireless protocol, has the following configuration.

The goggle 200 having a glasses like exterior (See FIG. 2) may include a lens controller 210, an LCD lens 215 having a left eye lens and a right eye lens, a receiver 220 for generating a control signal to the lens controller 210, and an optical diode 230 for sensing an infrared ray signal or a radio frequency signal from the stereo controller 300.

In this instance, the lenses of the glasses are small sized LCDs 215 controlled by the LCD controller 210. The LCD controller 210 has an electronic shutter driver function for closing all of the left eye lens and the right eye lens or opening either one of the lenses.

A time period in which either one of the lenses opens is equivalent to a wireless protocol time period between the stereo controller 300 and the goggle 200 added to a rising time period of the LCD lens 215 of the goggle 200. In one frame time period excluding the time period in which either one of the lenses opens, scanning is performed, in which the image signal is spread to the flat panel 100 in succession.

The wireless signal from the stereo controller 300 is an infrared ray IR or radio frequency RF signal.

In this instance, besides the infrared ray IR or radio frequency RF signal, the optical diode 230 can sense other forms of wireless signals from the stereo controller 300. The form of signal the optical diode 230 senses is determined taking a distance between the stereo controller 300 and the goggle 200. If the distance is short like a personal stereoscopic display device, the form of signal may be the infrared ray, and if the distance is long like a case of a theater, the form of signal may be the radio frequency RF.

An example of peripheral configurations and functions of the stereo controller 300 and the flat panel 100 will be described.

If the flat panel 100 is a computer monitor, the personal computer PC connected to the computer monitor may include a VGA card as the graphic processor 110 for controlling an image signal and a stereo 3D image signal. In this instance, the graphic processor 110 may apply a vertical synchronizing signal V-sync or a control signal to the stereo controller 300 so that the stereo controller 300 applies a signal to the goggle 200 in response to the signal from the graphic processor 110, for driving the goggle 200.

The flat panel 100 is turned on/off directly by the user as the user pushes a button type user signal applying unit 1200 provided to the flat panel 100. In this case, the user signal applying unit 1200 may be provided as a button on an exterior of the flat panel 100.

The user signal applying unit 1200 may be provided to an exterior of the stereo controller 300 as another button so that the user can directly control an open/close time of the left eye lens and the right eye lens which perceive at the goggle 200.

The flat panel 100 has a porch signal generated at every frame time of the image signal and a preset period of blank time after the porch signal. After the blank time, scanning of the image signal is performed. The porch signal and power 5V are applied to the flat panel 100 at a third USB port through a cable connected between the stereo controller 300 and the third USB.

In the meantime, the multimedia source device 120 is connected to the flat panel 100, at a DVI (Digital Video/Visual Interactive) port thereof if the flat panel 100 is the computer monitor, and at an HDMI (High-definition Multimedia Interface) port thereof if the flat panel 100 is the television set.

In this instance, the stereo controller 300, the flat panel 100, and the user signal applying unit 1200 and the multimedia source device 120 both mounted to the stereo controller 300 are electrically connected to the flat panel 100 through the USB port, an exterior button, or a specific port, and will be called as a image information supply source S, collectively taking those as one package.

In this instance, the goggle 200 is provided for the user to wear for watching the flat panel 100 while moving within a watchable region and receives the timing control signal from the stereo controller 300 in the infrared ray signal or the wire protocol of other frequency.

The stereoscopic display device having the goggle 200 and the stereo controller 300 for driving the goggle 200 automatically senses a timing mode, such as the porch signal and the blank time of the flat panel 100 according to a system of the multimedia source device 120 being reproduced or the graphic processor for reproducing in a mode meeting reproducing conditions of the multimedia source device 120 or the graphic processor, determines a relevant mode according to an image source (for an example, a movie, an animation, a video game, and so on) being reproduced thereby, generates an optical timing suitable to the mode, to turn the optical timing into the wireless protocol for displaying the stereo 3D image.

Modes on respective systems will be described, by using which a higher quality image source can be reproduced.

For an example, a display mode is a case when the flat panel 100 is used in purposes other than a PC interface, in which a basic timing of the flat panel 100 itself is used, and the flat panel 100 is operated regardless of a signal applied thereto. In this case, since received conditions are disregarded, connection of other device (3D reproducing device supported later) can be extended.

In the display mode, the synchronizing operation is possible only with the porch signal of the flat panel regardless of the signal from the graphic processor. In this instance, the flat panel 100, operating at 120 Hz, generates the vertical synchronizing signal V-sync in synchronization with the porch signal, and the stereo controller transmits the infrared ray or the radio frequency signal for operating the goggle.

A VGA (Video Graphic Array) mode has an effect in which a higher optical characteristic can be formed by putting the timing from the graphic processor to a top priority once the timing is checked in turning the timing generated at the graphic processor into protocol between the stereo controller and the goggle.

In detail, as an example of the VGA mode, there can be, for example, a VGA1 mode and a VGA2 mode depending on kinds of the graphic processor. In all conditions of the modes, when the stereo controller receives a signal from a VGA code left channel and a VGA code right channel of 5 ports of the flat panel upon putting the flat panel into operation at 120 Hz, the stereo controller operates in the VGA1 mode and or the VGA2 mode by transmitting the infrared ray signal or the like to the goggle disregarding the application of the porch signal.

Table 1 shows signal application states to the 5 ports of the flat panel in each of the modes.

| Port map (mini USB) | | Display mode | VGA1 mode | VGA2 mode |
|---|---|---|---|---|
| Port 1 | +5 V | ON | ON | ON |
| Port 2 | Porch signal | ON | ON | ON |
| Port 3 | VGA code left channel | | ON | ON |
| Port 4 | VGA code right channel | | ON | ON |
| Port 5 | GND | ON | ON | ON |

In this instance, it can be known that the power +5V and GND and the porch signal are applied in all of the modes (Display mode, VGA1 mode, VGA2 mode), and the signal is applied from the VGA code left channel and the VGA code right channel additionally. In the VGA mode, though there is the porch signal, the porch signal is disregarded.

Thus, the stereoscopic display device of the present disclosure is extendable, not only to the PC (Personal Computer) having the multimedia source device and the graphic processor, but also to the bluray player, the PS series, the Xbox and so on, and improve accessibility of a variety of multimedia source devices. Moreover, since the stereoscopic display device of the present disclosure can be controlled by the graphic processor in a general PC, enabling interchange with the devices used presently. In the meantime, if the general PC is used, the image information can be reproduced by mounting a disk to a DVD player in the PC.

The operation of the stereoscopic display device of the present disclosure will be described with reference to the timing diagram.

FIG. 5 illustrates a timing diagram on driving of a stereoscopic display device goggle of the present disclosure.

Referring to FIG. 5, the stereoscopic display device goggle closes the right eye lens when the left eye perceives, and closes the left eye lens when the right eye perceives, for the left eye and the right eye to perceive different images for perceiving only image for one eye clearly without interference with the image signal for the other eye. Moreover, since the image signals can overlap in a time period in which scanning of the screen on the flat panel is performed, both lenses of the goggle 200 are closed for cutting off the light.

The control for operation of the goggle lenses made at perception of the porch signal from the flat panel will be described.

In this instance, the porch signal being a signal projected upward to a predetermined level at a starting point of the frame of the flat panel, is matched to the starting point of every frame. The porch signal has a shape different from the vertical synchronizing signal, a square wave, applied in high/low signals to each of the frames of the left eye and the right eye.

For example, in a case of the flat panel 100 driven at 120 Hz, it may be said that the porch signal is applied at every 1/120 seconds, and a value equivalent to the 1/120 second is a frame rate. As a device develops the more, since a driving speed of the device will increase the more, a speed higher than above can be possible. A time period equivalent of one frame period will be called A (for an example 1/120 seconds).

In actual flat panel 100, there is a blank time of a predetermined time period after application of the porch signal. In the stereoscopic display device of the present disclosure, the blank time is set as a Goggle LCD time in which the image perception by the left eye lens or the right eye lens is made at the goggle 200 in the blank time after application of the porch signal. To do this, before application of the porch signal, an active signal of the goggle LCD lens is turned from high to low, making the liquid crystals in the goggle LCD lens to react, such that an end of a goggle LCD falling time E matches to the porch signal application time for enabling a left eye image signal perception right away at the opened left eye lens of the goggle LCD lens.

For example, if it is assumed that a time the left eye lens of the goggle opens is C and a time the right eye lens of the goggle opens is D, the values are the same with the times at other time points. The openings of the left eye lens and the right eye lens of the goggle 200 alternates, such that openings of the left eye lens and the right eye lens of the goggle 200 are made for the same time at time points different from one another.

During the time the screen scanning of the flat panel 100 is performed, which is a time period when the images overlaps, generating no regular left eye/right eye signals, both goggle lenses are closed, and in the timing diagram shown, an LCD Lens Active signal is at high. It is assumed that a time period taken in scanning is called as B.

After finishing the scanning, the protocol between the goggle and the stereo controller starts, which is called as a Goggle LCD protocol time, and the time is called as G.

The protocol time G starts when the goggle LCD lens active signal is turned from a high signal to a low signal and ends when the goggle LCD lens active signal is turned from a low signal to a high signal at the time the scanning of the flat panel is performed. And, at the time of starting of the protocol time G, the left eye lens of the goggle G opens C.

In the meantime, since the liquid crystals in the goggle LCD lens has a slow response speed when the lens is driven, the liquid crystals fail to respond to the turning of the high signal to the low signal at the time point of the protocol time G instantly, to have the Goggle LCD Falling Time E in the falling and a Goggle LCD Rising Time F in the rising of the liquid crystals in the turning of the low signal to the high signal at the time the protocol time ends.

In this instance, all of the open times C and D of the left eye and right eye lenses of the goggle LCD are equivalent to a time G+F which is the protocol time G added with the rising time F. In this instance, the protocol time G is equivalent to the blank time of the flat panel added to the falling time E. Since the falling time E and the rising time F may vary with composition of the liquid crystals, the falling time E and the rising time F can be adjusted by adjusting the composition of the liquid crystals contained in the goggle LCD lenses, thereby enabling to synchronize the end time point of the falling time E with the application of the porch signal, and to synchronize the end time point of the rising time F with the scanning time of the flat panel.

In this instance, after the falling time corresponding to the porch signal application, perception of the image is made at the left eye lens of the goggle opened actually (Goggle LCD dark time), this time is called as the blank time.

In the same manner, scanning is performed at other frame of the flat panel after the rising time F, and the protocol time is produced as the performance of the scanning is finished to open the right eye lens to become active, then, the image is perceived at the right eye lens in the goggle LCD dark time after the falling time is passed.

As has been described, the stereoscopic display device goggle, the stereo controller therefor, and the stereoscopic display device having the stereoscopic display device goggle and the stereo controller and the method for driving the same of the present disclosure have the following advantages.

First, the perception of the image information of the goggle is controlled in synchronization with the porch signal generated from a frame driving of the flat panel through the stereo controller. Accordingly, the error caused by delay of processing a video game or image information having a high frame rate at the time of relying on a related art graphic processor can be prevented.

Second, the synchronization with the porch signal which is generated in the frame driving of the flat panel enables to display a stereo 3D image regardless of a processing rate of the graphic processor even if frames are shifted at a high rate. According to this, since the image information of the goggle is perceived in synchronization with the porch signal generated at a more accurate flat panel in an optical point of view, improved optical characteristics, such as a fast response speed, high transmittance and contrast ratio, can be obtained.

Third, since the stereoscopic display device can be used by having the stereo controller which provides the wireless protocol to the goggle installed thereto, the error taken place when the related art hardware or software is installed can be prevented in advance, and a stereo 3D image display error caused by the installation error can be prevented.

Fourth, while the image information source device in the related art structure in which application of signal to the goggle relies on the graphic processor is limited to the personal computer PC, the stereoscopic display device of the present disclosure can improve multimedia accessibility as the stereoscopic display device enables association with the game player, the movie player, and the animation player which can display a stereo 3D image other than the PC.

Fifth, since the goggle can be controlled by the stereo controller by using the wireless protocol, the stereo controller can be connected to any port in the flat panel through a cable at the stereo controller, and connection to the multimedia source device is possible with a DVI or HDMI connection provided to the flat panel, system freedom of the stereoscopic display device can be improved, thereby improving reliability of the stereoscopic display device.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The invention claimed is:

1. A stereoscopic display system comprising:
a flat panel having a screen on which an image is displayed, the screen that generates a pulse signal of each frame of a plurality of frames and has a predetermined period of blank time after the pulse signal for each of the frames, the pulse signal for each of the frames being a pulse signal that rises to a predetermined level at a starting point of a corresponding one of the frames by the flat panel;
a stereo controller to generate a wireless goggle control signal;
a graphic processor to generate a Video Graphic Array (VGA) timing signal;
a multimedia source device to provide stereoscopic display information to the flat panel; and
a goggle having a left eye lens and a right eye lens, the goggle that receives the wireless goggle control signal according to a wireless protocol at a time of watching the flat panel and perceives a stereo 3D image by opening/closing the left eye lens and the right eye lens, selectively,
wherein in a display mode,
the flat panel generates a vertical synchronizing signal in synchronization with the pulse signal of each of the frames, and
the stereo controller checks the pulse signal of each of the frames from the screen of the flat panel, and transmits the wireless goggle control signal to the goggle, regardless of the VGA timing signal from the graphic processor, and
wherein in a VGA mode,
the stereo controller receives a VGA code signal of the flat panel and the stereo controller operates by transmitting the wireless goggle control signal to the goggle, disregarding the application of the pulse signal of each of the frames,
wherein scanning by the flat panel is processed after the blank time,
wherein in a first frame of the plurality of frames, the left eye lens is open and the right eye lens is closed during the blank time, and the left eye lens and the right eye lens are closed during scanning by the flat panel after the blank time of the first frame, and
wherein in a second frame immediately after the first frame of the plurality of frames, the right eye lens is open and the left eye lens is closed during the blank time, and the left eye lens and the right eye lens are closed during scanning by the flat panel after the blank time of the second frame.

2. The system as claimed in claim 1, wherein the stereo controller is connected to a port of the flat panel with a cable.

3. The system as claimed in claim 1, wherein the stereo controller has an on/off power voltage.

4. The system as claimed in claim 1, wherein the flat panel includes a monitor or a television set.

5. The system as claimed in claim 1, wherein the multimedia source device, wherein the multimedia source device is one selected from a bluray player, a video game player, a PC (Personal Computer), and a workstation.

6. The system as claimed in claim 5, wherein the multimedia source device and the flat panel are connected through a DVI (Digital Video/Visual Interactive) port or an HDMI (High-definition Multimedia Interface) port.

7. The system as claimed in claim 1, wherein the goggle includes:
the left eye lens and the right eye lens of LCD lenses,
a power supply unit that supplies a power,
a receiver that senses and receives the wireless goggle control signal from the stereo controller, and
a lens controller that controls opening/closing of the left eye lens and the right eye lens in response to the wireless goggle control signal.

8. The system as claimed in claim 7,
wherein the goggle generates an active signal that causes the left eye lens and the right eye lens to open and close selectively, based on the wireless goggle control signal, the active signal enabling the stereo 3D image to be perceived from the flat panel via the left and right lenses, and
wherein a predetermined LCD falling time after the active signal transitions from a first level to a second level, one of the LCD lenses opens, and an end of the LCD falling time is synchronized with a start of the pulse signal for each of the frames.

9. The system as claimed in claim 8, wherein a predetermined LCD rising time after the active signal transitions from the second level to the first level, one of the LCD lenses closes, and an end of the LCD rising time is synchronized with a start of the scanning time for each of the frames.

10. The system as claimed in claim 9, wherein the stereo controller and the goggle wirelessly communicate only during the LCD falling time of one of the LCD lenses and during the blank time after the pulse signal for each of the frames, in the display mode.

11. A method comprising:
receiving, by a flat panel, stereo three-dimensional (3D) image information;
displaying, by the flat panel, a plurality of frames using the 3D image information;
scanning, by the flat panel, during a scanning time for each of the frames;
generating, by the flat panel, a pulse signal for each of the frames, the pulse signal for each of the frames being a pulse signal that rises to a predetermined level at a starting point of a corresponding one of the frames displayed by the flat panel, the flat panel having a predetermined period of blank time after the pulse signal for each of the frames;
in a display mode, receiving the pulse signal for each of the frames from a screen of the flat panel, and generating a wireless goggle control signal being synchronized with the received pulse signal for each of the frames by a stereo controller, regardless of other timing signals from other devices than the flat panel;
in a Video Graphic Array (VGA) mode, checking a timing signal from a graphic processor to a top priority by the stereo controller and generating a wireless goggle control signal by the stereo controller based on the timing signal received from the graphic processor by disregarding the pulse signal for each of the frames from the flat panel;
by a goggle, receiving the wireless goggle control signal in the display mode or in the VGA mode according to a wireless protocol;
generating, by the goggle, an active signal that causes a left eye lens of the goggle and a right eye lens of the goggle to open and close selectively, based on the wireless goggle control signal, the active signal enabling a 3D image to be perceived from the flat panel via the lenses; and
alternately opening, by the goggle, the left eye lens and the right eye lens only during the blank time after the pulse signal for each of the frames, in the display mode,
wherein in a first frame of the plurality of frames, the left eye lens is open and the right eye lens is closed during the blank time, and the left eye lens and the right eye lens are closed during scanning by the flat panel after the blank time of the first frame, and
wherein in a second frame immediately after the first frame of the plurality of frames, the right eye lens is open and the left eye lens is closed during the blank time, and the left eye lens and the right eye lens are closed during scanning by the flat panel after the blank time of the second frame.

12. The method as claimed in claim 11, wherein the left eye lens and the right eye lens are liquid crystal display (LCD) lenses, the method further comprising:
opening, by the goggle, one of the LCD lenses a predetermined LCD falling time after the active signal transitions from a first level to a second level, wherein an end of the LCD falling time is synchronized with a start of the pulse signal for each of the frames.

13. The method as claimed in claim 12, further comprising:
closing, by the goggle, one of the LCD lenses a predetermined LCD rising time after the active signal transitions from the second level to the first level, wherein an end of the LCD rising time is synchronized with a start of the scanning time for each of the frames.

14. The method as claimed in claim 13, further comprising:
wirelessly communicating between the stereo controller and the goggle only during the LCD falling time of one of the LCD lenses and during the blank time after the pulse signal for each of the frames, in the display mode.

15. A stereoscopic display system comprising:
a main liquid crystal display panel having a driving unit;
a multi media source connected to the main liquid crystal display panel;
a graphic processor connected to the main liquid crystal display panel;
a stereo controller connected to the main liquid crystal display panel; and
a goggle including a left eye liquid crystal display (LCD) lens and a right eye LCD lens, separated from the main liquid crystal display panel;
wherein the main liquid crystal display panel displays 3D images of a plurality of frames, each of the frames having a predetermined period of blank time, a rising time and a scanning time and a falling time in succession, and
the main liquid crystal display panel generates a pulse signal for each of the frames, the pulse signal for each of the frames being a pulse signal that rises to a predetermined level at a starting point of a corresponding one of the frames, the blank time is after the pulse signal;
wherein in a display mode,
the main liquid crystal display panel generates a vertical synchronizing signal in synchronization with the pulse signal for each of the frames, and
the stereo controller checks the pulse signal for each of the frames and the vertical synchronizing signal from a screen of the flat panel, and transmits the wireless goggle control signal to the goggle, regardless of a VGA timing signal from the graphic processor, and
wherein in a VGA mode,
the stereo controller receives a VGA code signal of the main liquid crystal display panel and the stereo controller operates by transmitting the wireless goggle control signal to the goggle, disregarding the application of the pulse signal of each of the frames,
wherein the goggle that, in operation:
generates an active signal that causes the left eye LCD lens and the right eye LCD lens to open and close selectively, based on the wireless goggle control signal in the display mode or in the VGA mode, the active signal enabling a 3D image to be perceived from the main liquid crystal display panel via the LCD lenses,
wherein, in the display mode, the left eye lens and the right eye lens are alternately opened only during the blank time after the pulse signal and the rising time for each of the frames,
wherein in a first frame of the plurality of frames, the left eye lens is open and the right eye lens is closed during the blank time, and the left eye lens and the right eye lens are closed during scanning after the blank time of the first frame, and
wherein in a second frame immediately after the first frame of the plurality of frames, the right eye lens is open and the left eye lens is closed during the blank time, and the left eye lens and the right eye lens are closed during scanning after the blank time of the second frame.

16. The system as claimed in claim 15, wherein the stereo controller and the goggle wirelessly communicate only during the LCD falling time of one of the LCD lenses and during the blank time after the pulse signal for each of the frames, in the display mode.

* * * * *